United States Patent

Sarracino

[15] 3,705,586
[45] Dec. 12, 1972

[54] UMBILICAL CORD CLAMP

[72] Inventor: John B. Sarracino, 4309 Forest wood Drive, San Jose, Calif. 95121

[22] Filed: March 4, 1971

[21] Appl. No.: 120,948

[52] U.S. Cl............128/346, 24/248 BB, 24/259 A
[51] Int. Cl.............................................A61b 17/08
[58] Field of Search............128/346, 321, 326, 325; 24/73 LF, 248 BB, 259 A

[56] References Cited

UNITED STATES PATENTS

| | | | |
|---|---|---|---|
| 3,247,852 | 4/1966 | Schneider | 128/346 |
| 3,608,554 | 9/1971 | McGuinness | 128/346 X |
| 2,498,372 | 2/1950 | Kortlucke et al. | 128/346 |
| 3,171,184 | 3/1965 | Posse | 128/346 X |
| 600,887 | 3/1898 | Pettit | 128/346 |
| 2,108,325 | 2/1938 | Ziegler | 128/346 |
| 3,315,679 | 4/1967 | Sarracino | 128/346 |

Primary Examiner—Dalton L. Truluck
Attorney—Townsend & Townsend

[57] ABSTRACT

An umbilical cord clamp for closing the cord stump on a newborn infant. The clamp has a pair of opposing clamping members biased into an open, inclined position by a spring interconnecting first ends of the members and is closed by locking second, free ends of the members together. The members define a first set of interengaging channels and coacting protrusions which are perpendicular to the stump and a second set of coacting channels and protrusions which are transverse to the first set. Sections of the cord are biased into the first and second channels to thereby fold the cord in transverse directions and prevent the clamp from slipping along or transversely to the cord stump.

12 Claims, 7 Drawing Figures

PATENTED DEC 12 1972  3,705,586
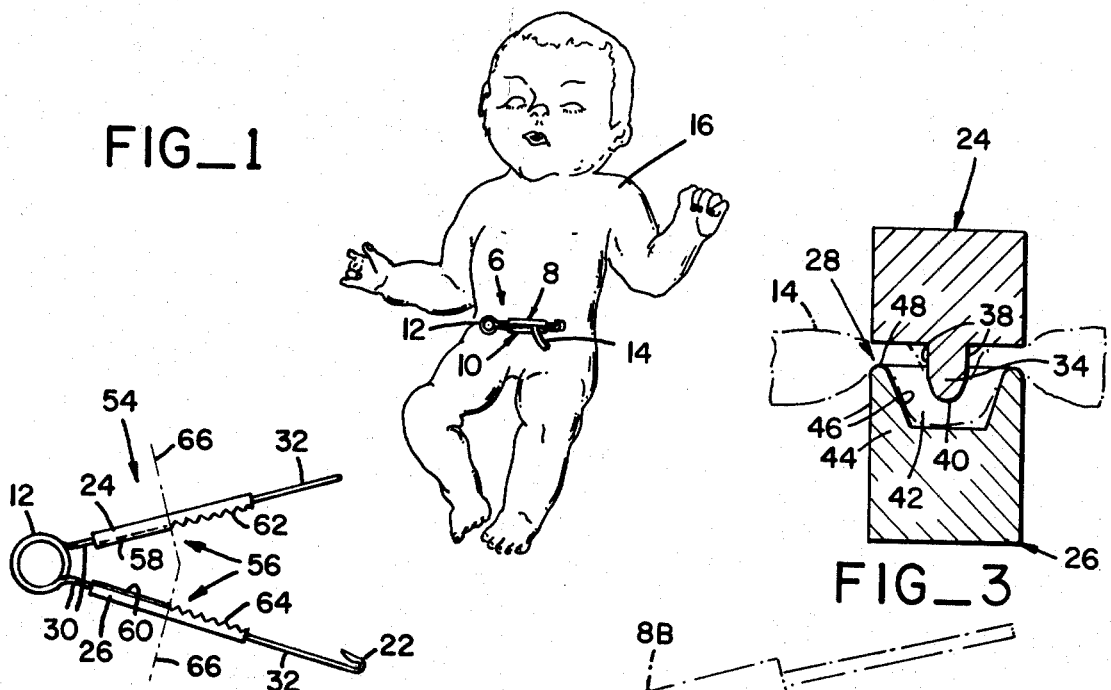
FIG_1
FIG_3
FIG_7
FIG_2
FIG_4
FIG_5
FIG_6
INVENTOR.
JOHN B. SARRACINO
BY
Townsend and Townsend
ATTORNEYS

3,705,586

1
UMBILICAL CORD CLAMP

BACKGROUND OF THE INVENTION

This invention relates to a clamp for securely sealing an umbilical cord stump on a newborn infant. Secure closure and sealing of the cord stump is essential to promote rapid healing of the stump without infection. Furthermore, the closure of the stump is preferably rapidly effected to minimize discomfort to the infant.

Such clamps are known in the prior art. A particularly useful clamp is described in my U.S. Pat. No. 3,315,679 in which a jaw like clamp is provided with interengaging serrations. The clamp has some resiliency so that upon its closure on a cord stump the cord is not severed. The clamp described in that patent is convenient to use, is rapidly applied to the cord stump for the above referred to comfort of the infant, and is inexpensive to construct. Such clamps represent a substantial improvement over clamps theretofore known.

However, the clamps described in the above referenced patent are not as secure as is desired when applied to the cord stump. In particular, while the serrations prevent movement of the clamp transverse to the cord stump, the serrations have a substantially lesser holding power against movements along the cord stump. Since the clamp remains on the infant for relatively long periods of time, say for several days, it must hold during all movements of the infant. The clamp described in that patent does not have as good a holding power as might sometimes be required. Under adverse conditions it can slip off the end of the cord stump.

SUMMARY OF THE INVENTION

The present invention provides a clamp for closing an umbilical cord stump which is convenient to use, inexpensive to manufacture and which is securely retained to the cord. Briefly, a clamp constructed in accordance with the invention comprises a pair of opposing first and second members that have first and second cooperating portions for compression of the cord stump therebetween. The first portions form first folded stump sections extending in a first direction, and the second portions form second folded stump sections extending in a second direction substantially perpendicular to the first direction. Means is further provided for resiliently biasing the members towards each other to fold the stump sections between the portions. Slippage of the clamp in the direction of the stump or in a direction transverse thereto is thus prevented.

In the preferred embodiment of the invention, the first and second portions are defined by a plurality of sets of spaced apart first protrusions on the first member that face towards the second member to define first channels extending in the direction of the length of the members. The first protrusions define operative ends and the effective width of the first member. A central ridge depends from the second member and is positioned to cooperate with the first channels to bias sections of the umbilical cord into the first channels by folding the sections in a first direction parallel to the members. The ridge includes at least one notch defining at least one second channel positioned substantially perpendicular to the first channels and located between ends of the protrusion sets. A number of second ridges equalling the number of notches depend from the first member, are positioned between protrusion sets and extend transversely to the first channels and the ridge for cooperation with the slots and for biasing other sections of the cord into the slots by folding the other sections in a direction transverse to the members.

Umbilical cord clamps constructed in accordance with the invention provide a firm grip on the cord stump and prevent clamp slippage in either direction. The channels and coacting ridges are so constructed that there is space between them to accommodate the cord sections without their rupture, puncture, shearing or incising. The clamp can remain on the cord for as long as required without danger of slipping along the cord stump or transversely thereto and becoming accidentally disengaged. The clamp can be snapped onto the cord stump immediately after birth for maximum efficiency and preventing the infant from suffering discomfort. Thus, umbilical cord clamps constructed in accordance with the invention are a substantial improvement over such clamps heretofore available.

In another embodiment of the invention the first and second cooperating stump compressing portions are each arranged on one side of the longitudinal middle of the clamp members. In use, the clamp middle is aligned with the center of the stump and the clamp is closed so that it is gripped by both portions and prevented from moving along or transverse to the stump.

In still a further embodiment of the invention the clamp members are provided with protrusions and matching grooves that extend over the full effective length of the clamp. Such grooves prevent clamp slippage along the stump and are particularly useful in instances where the clamps remain on the stump for a short period only. Such clamps are further very economical to construct.

BRIEF DESCRIPTION OF THE DRAWINGS

FIG. 1 shows a newborn infant and a clamp constructed in accordance with the invention secured to his umbilical cord stump;

FIG. 2 is a side elevational view of the clamp illustrated in FIG. 1 and shows the open position in phantom lines;

FIG. 3 is a cross sectional elevation of the clamp taken on lines 3—3 of FIG. 2 and shows the gripped and folded umbilical cord in phantom lines;

FIG. 4 is an enlarged, fragmentary side elevational view showing the means for gripping the cord stump in transverse direction in greater detail;

FIG. 5 is a side elevational view similar to FIG. 2 but on a reduced scale and illustrates an embodiment of the invention in which stump engaging protrusions run parallel to the length of the clamp;

FIG. 6 is a side elevational view, in section, and is taken on line 6—6 of FIG. 5; and FIG. 7 is a side elevational view similar to FIG. 2, but on a reduced scale, and shows yet another embodiment of the invention with differently arranged transverse cord gripping means.

DESCRIPTION OF THE PREFERRED EMBODIMENTS

Referring to FIGS. 1 and 2, a clamp 6 constructed in accordance with the invention comprises a pair of jaws 8 and 10 that are biased into an open position (identified with 8B in FIG. 2) by a spring 12 connected to an end of each jaw. The clamp is applied to an umbilical cord stump 14 of a newborn infant 16 and is locked in its closed position by engaging free end 18 of jaw 8 with a concave portion 20 of hook 22 mounted to jaw 10. The jaws are defined by elongate clamping members of bars 24 and 26, respectively, which define locking means 28 that prevent movement of the camp along or transverse to cord stump 14 to thereby securely retain the clamp to the stump.

Referring to FIGS. 2 through 4, clamping bars 24 and 26 are positioned about midway between ends of jaws 8 and 10. The inner ends of the bars (facing spring 12) are connected with ends of the spring via short, reduced diameter posts 30. Relatively springy or resilient pins 32 project from the other ends of the bars. One of the pins mounts hook 22 which extends forward of the end of the other pin for releasably engaging the other pin to close the clamp and resiliently bias the clamping bars 24, 26 towards each other.

Upper (as viewed in FIGS. 2 through 4) clamping bar 24 includes a plurality of preferably four centered and aligned downwardly depending ridges or protrusions 34 which extend substantially over the length of the cross bar 24. The protrusions are separated by generally V-shaped transverse grooves or slots 36, the axes of which are perpendicular to the longitudinal extent of the ridges. For purposes more fully described hereinafter, the ridges terminate in tapered sides 38 which meet in relatively sharp but radiused ridge edges 40.

The side of lower (as viewed in FIGS. 2 through 4) clamping bar 26 facing upwardly towards the other clamping bar includes a plurality of aligned, longitudinally spaced apart channels 42 which have a length about equal to the length of ridges 34 and which are positioned so that the ridges enter the channels when jaws 8 and 10 of clamp 6 are closed. The channels are defined by laterally spaced upright walls 44 which also terminate in tapered sides 46 that meet at relatively sharp but radiused channel wall edges 48. The depth of channels 42 and the transverse spacing of channel walls 44 is slightly greater than the height and the width, respectively, of ridges 34 so that there remain voids between the channels and the ridges when the clamp is closed.

Lower cross bar 26 also includes a plurality of transversely oriented upwardly extending protrusions 50 positioned between channels 42 and extending substantially perpendicular to the length of the channels. Protrusions 50 have a lesser cross section than the cross section of slots 36 and a height so that the protrusions do not contact the slots and the upper cross bar 24 when the clamp is closed. The protrusions also include tapered sides that meet at relatively sharp but radiused top edges 52.

In use, clamp 6 is opened by disengaging the free end of pin 32 projecting from upper clamping bar 24 so that spring 12 can bias the bars into the inclined position as illustrated in phantom lines in FIG. 2. The clamp is applied by placing the open jaws 8 and 10 over the infant's umbilical cord stump 14 rearwardly of the severed stump end. The clamp is then closed by compressing the jaws towards each other and engaging the free ends of pin 32 protruding from clamping bar 24 in concave portion 20 of hook 22.

As the jaws are compressed, the umbilical cord is first flattened and sections thereof are then deformed in two perpendicular directions by folding such sections about ridges 34 and protrusions 50 into channels 42 and slots 36. The voids remaining between the channels and the ridges and between the protrusions and the slots become filled with the folded cord sections. Excessive compression of the cord, which can result in its rupture and/or puncture, is thereby avoided. Furthermore, the folding of the cord sections into the voids eliminates high pressure areas and large forces which can permanently deform the clamp and make its closure difficult. The formation of the sharp but radiused edges on the ridges and transverse protrusions of the jaws facilitates the folding of the cord sections into the channels and the slots while preventing incisions into the cord sections from knife edges and the like.

For practical use of the clamp on newborn infants the length of cross bars 24 and 26 is preferably between about 20 to 30 millimeters. The longitudinal ridges 34 and transverse protrusions 50 are equally spaced over the length of the cross bars. It is preferred to place a ridge 34-channel 42 combination at each end of the cross bars so that there is one more ridge-channel combination than there are protrusion 50-slot 36 combinations. This facilitates the ease with which the clamp is applied and closed by providing a greater transverse moment which tends to align the cross bars 24 and 26 and bias free pin 32 into concave portion 20 of hook 22.

Referring to FIG. 7, in another embodiment of the invention, an umbilical cord clamp 54 is identically constructed as clamp 6 shown in FIG. 2, and thus includes spring 12, a pair of cross bars 24 and 26, posts 30 connecting the cross bars with the end of the spring, pins 32 at the other end of the cross bar and a hook 22 for retaining the cross bars in their closed position as above described. One of the interfaces 56 of the cross bars, however, includes a set of longitudinal protrusions 58 which nest in matching longitudinal grooves 60 of the opposing interface, and relatively short transverse protrusions 62 which nest in corresponding transverse grooves 64 of the opposing interface. Each set of protrusions and matching grooves is disposed on one side of an imaginary longitudinal center line 66 of cross bars 24 and 26.

In use, clamp 54 is placed over the infant's umbilical cord stump so that center line 66 of cross bars 24 and 26 overlies the stump and is preferably substantially aligned with the stump center. The clamp is then closed whereby the stump is gripped by both the longitudinal and transverse protrusions and grooves. Clamp movements in the direction of the stump as well as transversely thereto are thereby prevented.

Referring to FIGS. 5 and 6, another, simplified embodiment of the invention is particularly well adapted for brief applications of the clamp to the stump and for preventing the clamp from slipping off the free stump end. The simplified clamp again comprises a spring 12 to which cross bars 24 and 26 are attached and which is closed by engaging pin 32 and hook 22. One of the interfaces 68 of the clamp includes longitudinally extending protrusions 70 which nest in matching longitudinal grooves 72 of the other interface and which extend over the full effective clamp length, that is over the full length of cross bars 24 and 26. At least one cooperating protrusion-groove set is provided. Preferably, however, two or more cooperating sets are employed to more securely close the umbilical cord stump and to more firmly grasp the stump.

In use, the clamp illustrated in FIGS. 5 and 6 is applied to the infant's umbilical cord stump as heretofore described. The cooperating longitudinal protrusion 70 and groove 72 fold the stump about the protrusion and into the groove and prevent slippage of the clamp along the cord stump.

I claim:

1. A clamp for closing an umbilical cord stump on a newborn infant and for securing the clamp to the stump to prevent longitudinal or lateral motions of the clamp on the stump comprising: a pair of substantially straight first and second members, spring means connected with first ends of the members and biasing the members into a mutually inclined position, lock means on one of said members for retaining the members against the force of the spring means substantially parallel and in close proximity, and umbilical cord gripping and closing means defined by the members and including at least one first protrusion and a corresponding first groove on the first and second members, respectively, extending longitudinally of the members over a portion of the length of the members transversely to the cord stump, at least one second protrusion and a corresponding second groove defined by the members, the second protrusion and the second groove being positioned at an end of and substantially contiguous with the first groove and the first protrusion and extending perpendicular to the first groove and protrusion across substantially the full width of the members whereby closure of the clamp over a stump folds the stump in perpendicular directions to thereby firmly grip and close the cord and prevent clamp slippage along the cord or perpendicular thereto.

2. A clamp according to claim 1 wherein the members are elongate and wherein about one-half of the members include a first groove and a first protrusion and another half of the members include a plurality of second grooves and second protrusions.

3. A clamp according to claim 2 wherein the first and second grooves and protrusions meet at about the center of the length of the members.

4. A clamp according to claim 1 wherein the first and second grooves and protrusions are alternatingly positioned on the members one behind the other.

5. An umbilical cord clamp comprising first and second transverse clamping bars, means for resiliently biasing the clamping bars towards each other, and anti-slippage cord closing means including at least two spaced apart first channel members extending parallel to and connected with one of the first and second bars and facing towards the other one of the clamping bars, a second channel member extending substantially perpendicularly to the first channel members, the second channel member being connected to one of the first and second bars, extending substantially fully across the width of such bar, being positioned at a space between the first channel members and facing the other one of the clamping bars, at least two spaced apart first protrusions extending in the direction of the bars for cooperation with and for biasing a section of the cord into the first channel members to thereby firmly grip the section and prevent the clamp from slipping along the cord, the first protrusions being secured to the clamping bar opposing the first channel members, and a second protrusion extending substantially perpendicular to the bars for cooperation with and for biasing another section of the cord into the second channel member to thereby further grip the cord and prevent the clamp from slipping on the cord in a transverse direction, the second protrusion being secured to the clamping bar at a location opposing the second channel member.

6. A clamp according to claim 5 including a plurality of first and second channel members and a corresponding plurality of first and second protrusions, the members and protrusions being serially and alternatingly arranged along the bars.

7. A clamp according to claim 6 wherein the number of first channel members and first protrusions exceeds the number of second channel members and second protrusions by one.

8. A clamp according to claim 6 wherein the channel members and the protrusions include wall means defined by surfaces tapering towards the opposing bar, and including radiused surfaces interconnecting the surfaces and defining umbilical cord engaging edges incapable of incising the cord sections.

9. A clamp according to claim 6 wherein the first channel member and protrusion has a length substantially greater than the length of the second channel member and protrusion.

10. A clamp for closing an umbilical cord stump on a newborn infant comprising: a pair of substantially straight first and second members, spring means connected with first ends of the members and biasing the members into a mutually inclined position, lock means on one of said members for retaining the members against the force of the spring means substantially parallel and in close proximity, and umbilical cord gripping and closing means defined by the members and including a plurality of sets of spaced apart first protrusions on the first member, facing towards the second member and defining first channels extending in the direction of the length of the members, the first protrusions defining operative ends of the first member and the effective width of the first member, a central ridge depending from the second member and positioned to cooperate with the first channels to bias sections of the umbilical cord into the first channels by folding the sections in a first direction parallel to the members, the ridge including at least one notch defining at least one second channel positioned substantially perpendicular to the first channels and located between ends of the protrusion sets, a number of second ridges equalling the number of notches depending from the first member, positioned between the protrusion sets and extending transversely to the first channels and the ridge for cooperation with the slots and biasing other sections of the cord into the slots by folding the other sections in a direction transverse to the members, whereby application of the clamp over an umbilical cord stump and closure of the clamp folds the cord in transverse directions into the channels and the slots to firmly grip and close the cord and prevent clamp slippage along the cord or perpendicular thereto.

11. A clamp according to claim 10 including means on the protrusions and ridges preventing the formation of sharp edges that can pierce or incice the cord.

12. A clamp according to claim 10 wherein the ridges have a lesser cross section than the clear cross section of the first channels and of the slots to facilitate the folding of the cord sections into the channels and the slots and prevent cord rupture and clamp sticking and deformation.

* * * * *